Patented Jan. 23, 1934

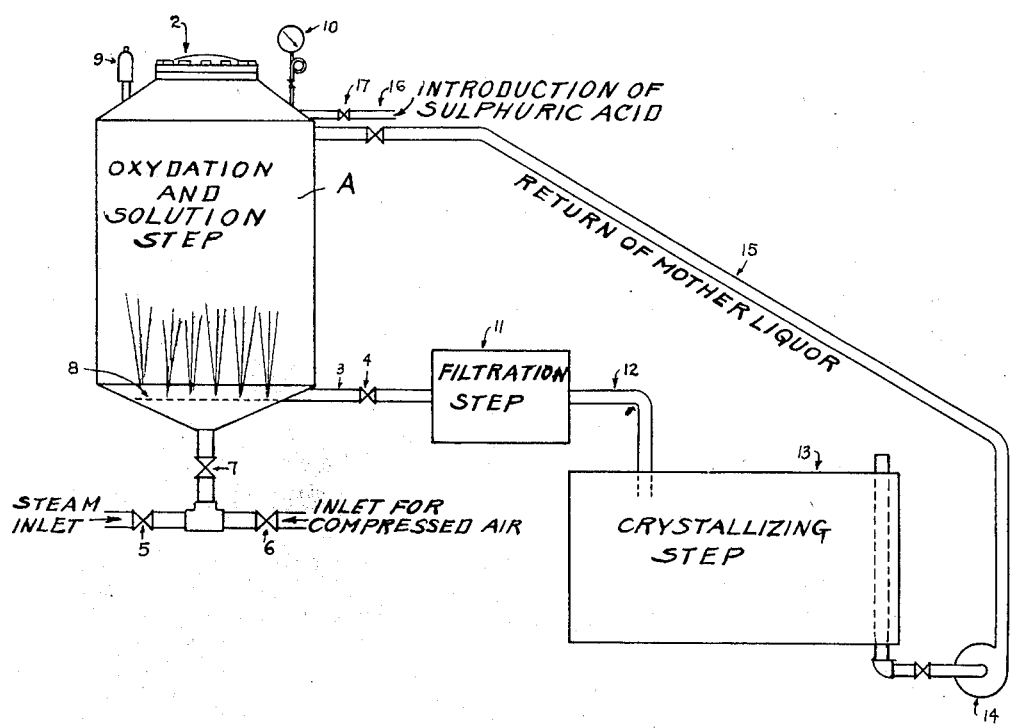

1,944,444

UNITED STATES PATENT OFFICE 1,944,444

PRODUCTION OF COPPER SULPHATE IN SOLUTION FROM METALLIC OR SCRAP COPPER AND DILUTE SULPHURIC ACID

Daniel W. Marsh and Benjamin H. Marsh, Oakland, Calif.

Application July 1, 1931. Serial No. 548,160

7 Claims. (Cl. 23—125)

This invention relates to the oxidation of metallic copper immersed in a dilute solution of sulphuric acid, the reaction taking place in a pressure tank or vessel into which is introduced air or air and steam, preferably in a finely divided condition, thereby converting the metallic copper to copper sulphate in solution. This process will rapidly convert any kind of metallic copper such as copper sheets, strips or wire etc. into copper sulphate to any desired degree of concentration. The copper sulphate solution thus formed may then be run into a crystallizing tank or used for producing copper carbonate or other compounds of copper.

An apparatus suitable for the operation of the process is shown in the accompanying drawing. This pressure tank or vessel is so constructed as to resist corrosion and to withstand whatever pressure is to be used in the operation of the process. For this purpose, tank A may be formed of wood, lead lined and suitably supported or mounted and reinforced to withstand the required pressure or it may be of iron or steel construction lined with lead or other resistant material. Oxidizing tank A is provided with a manhole or removable cover 2 at its top to permit charging the vessel with metallic copper, and with an outlet or discharge pipe 3 provided with valve 4 for discharging the contents after oxidation is complete. Means are provided for supplying compressed air and for supplying steam. The steam supplied is regulated by valve 5 and the compressed air by valve 6. It is preferable to introduce both air and steam together through valve 7 to the bottom of the tank. Character 8 indicates a perforated lead plate suitably supported through which the current of air and steam pass in a finely divided state to circulate through the solution part of which escapes through relief valve 9 at the top of the tank. The air is introduced at a pressure of about 25 or 30 pounds per square inch. The steam so supplied may be at about the same pressure as the air and at a temperature corresponding to such pressure or it may be superheated if desired but in any case the amount of steam admitted is only sufficient to heat the liquid to the desired temperature. Pressure control in the tank or vessel is regulated by relief valve 9 with pressure gauge 10 for indicating the pressure. From pressure or oxidizing tank A, discharge pipe 3 may lead to filter 11 and through pipe 12 to crystallizing tank 13. The uncrystallized solution is returned through pump 14 and pipe 15 to the oxidizing tank A for further concentration.

The process may be carried out in the above described apparatus as follows:

Oxidizing tank A is charged with metallic copper and a suitable amount of dilute sulphuric acid of desired concentration is introduced through pipe 16 and valve 17. Steam is then admitted through valves 6 and 7 or the solution is otherwise heated in any suitable manner until the desired temperature is obtained, preferably in the neighborhood of 90 degrees to 100 degrees centigrade. In order to maintain the desired pressure within the tank A, a relief valve 9 is so adjusted that it will allow the escape of excess air or steam when such pressure is attained. Air under pressure, supplied from an air tank or compressor or blower is introduced through valves 5 and 7 together with the steam. The solution is maintained at 90 degrees to 100 degrees centigrade and the pressure which is maintained within the oxidizing tank A during this reaction is above atmospheric pressure, preferably in the neighborhood of 25 to 30 pounds per square inch. A certain amount of air is continually escaping through relief valve 9 and the more rapidly the air is forced through the liquid, the more rapid will be the conversion of the metallic copper to copper sulphate in solution.

When the reaction is complete, the steam is discontinued and the copper sulphate solution is forced through filter 11 and into crystallizing tank 13 where it is allowed to cool and crystallize. The uncrystallized portion is returned to tank A through pump 14 and pipe 15 for further concentration.

While we have shown one form of apparatus suitable for carrying out our process, various other forms of apparatus may be employed for this purpose, the essential feature of our process being the conversion of metallic copper to copper sulphate solution while in a closed reaction vessel by introducing an oxidizing agent such as air or air and steam, the conversion or reaction taking place under pressure greater than atmospheric pressure and at an elevated temperature.

Having thus described our invention, what we claim and desire to secure by Letters Patent is:

1. The process which consists of heating a dilute solution of sulphuric acid in a closed reaction vessel containing metallic copper immersed therein, passing air into the vessel and through said solution while maintaining within the reaction vessel, a pressure above atmospheric pressure and an elevated temperature so as to convert metallic copper into copper sulphate solution.

2. The process which comprises passing air through a hot solution of dilute sulphuric acid containing metallic copper immersed therein, passing air into the vessel, under a pressure greater than atmospheric while heating the solution to an elevated temperature.

3. The method of producing copper sulphate in solution by immersing metallic copper in a dilute solution of sulphuric acid while in a closed vessel, passing air and steam into the vessel under a pressure greater than atmospheric pressure and at an elevated temperature and allowing the solution to run into crystallizing tank, cool and crystallize.

4. The process which comprises subjecting metallic copper to the oxidizing action of air and steam while immersed in a hot solution of dilute sulphuric acid within a closed reaction vessel wherein the pressure is greater than atmospheric pressure.

5. The process which comprises subjecting metallic copper to the oxidizing action of air and steam while immersed in a solution of copper sulphate within a closed reaction vessel wherein the pressure is greater than atmospheric pressure.

6. The method of producing copper sulphate in solution by immersing metallic copper in a dilute solution of sulphuric acid while in a closed vessel and passing air and steam into the vessel under a pressure greater than atmospheric pressure.

7. In a process of dissolving metallic copper in sulphuric acid which comprises suspending metallic copper in dilute sulphuric acid, and acting upon said reaction mixture with an oxygen containing gas, the step of maintaining the reaction mixture at super-atmospheric pressure and at an elevated temperature.

DANIEL W. MARSH.
BENJAMIN H. MARSH.